United States Patent
Zohar

(10) Patent No.: US 8,776,052 B2
(45) Date of Patent: Jul. 8, 2014

(54) METHOD, AN APPARATUS AND A SYSTEM FOR MANAGING A DISTRIBUTED COMPRESSION SYSTEM

(75) Inventor: Ofir Zohar, Alfe-Menashe (IL)

(73) Assignee: International Business Machines Corporation, Armonk, NY (US)

( * ) Notice: Subject to any disclaimer, the term of this patent is extended or adjusted under 35 U.S.C. 154(b) by 1438 days.

(21) Appl. No.: 11/707,615

(22) Filed: Feb. 16, 2007

(65) Prior Publication Data

US 2008/0201718 A1     Aug. 21, 2008

(51) Int. Cl.
*G06F 9/455*     (2006.01)
*G06F 7/00*     (2006.01)

(52) U.S. Cl.
USPC ............................................. 718/1; 707/758

(58) Field of Classification Search
USPC .......... 709/247; 717/149, 106; 341/50; 718/1
See application file for complete search history.

(56) References Cited

U.S. PATENT DOCUMENTS

| | | | | |
|---|---|---|---|---|
| 4,380,071 | A  * | 4/1983 | Odaka ........................... | 714/758 |
| 5,535,393 | A  * | 7/1996 | Reeve et al. ................... | 717/149 |
| 5,743,715 | A  * | 4/1998 | Staroselsky et al. .............. | 417/6 |
| 6,425,018 | B1 * | 7/2002 | Kaganas et al. .................... | 710/1 |
| 6,452,924 | B1 * | 9/2002 | Golden et al. ................ | 370/352 |
| 6,687,802 | B1 * | 2/2004 | Kori et al. ...................... | 711/163 |
| 6,891,843 | B1 * | 5/2005 | Sang et al. .................... | 370/406 |
| 7,047,301 | B2 * | 5/2006 | Skene et al. ................... | 709/226 |
| 7,353,541 | B1 * | 4/2008 | Ishibashi et al. ................ | 726/26 |
| 7,385,979 | B2 * | 6/2008 | Harald .......................... | 370/392 |
| 7,599,834 | B2 * | 10/2009 | Raad et al. .................... | 704/219 |
| 7,738,452 | B1 * | 6/2010 | O'Rourke et al. ............ | 370/389 |
| 7,877,401 | B1 * | 1/2011 | Hostetter et al. .............. | 707/758 |
| 7,965,373 | B2 * | 6/2011 | Hoeks et al. ..................... | 355/53 |
| 8,620,940 | B1 * | 12/2013 | Hostetter et al. ............. | 707/758 |
| 2001/0047415 | A1 * | 11/2001 | Skene et al. ................. | 709/226 |
| 2002/0056010 | A1 * | 5/2002 | Lincoln et al. ................ | 709/247 |
| 2003/0034905 | A1 | 2/2003 | Anton et al. | |
| 2003/0046238 | A1 * | 3/2003 | Nonaka et al. ................... | 705/51 |
| 2003/0115447 | A1 * | 6/2003 | Pham et al. .................... | 713/153 |
| 2004/0221128 | A1 * | 11/2004 | Beecroft et al. .............. | 711/203 |
| 2005/0015566 | A1 | 1/2005 | Zohar et al. | |
| 2005/0152278 | A1 * | 7/2005 | Schantz ........................ | 370/252 |
| 2005/0188112 | A1 * | 8/2005 | Desai et al. ................... | 709/247 |
| 2007/0109153 | A1 * | 5/2007 | Ma et al. .......................... | 341/50 |
| 2007/0296631 | A1 * | 12/2007 | Ray .............................. | 342/387 |
| 2008/0140938 | A1 * | 6/2008 | Khemani et al. .............. | 711/133 |
| 2008/0201689 | A1 * | 8/2008 | Lin ............................... | 717/106 |
| 2008/0243959 | A1 * | 10/2008 | Bacastow et al. ............ | 707/204 |

(Continued)

*Primary Examiner* — Krista Zele
*Assistant Examiner* — Margishi Desai
(74) *Attorney, Agent, or Firm* — Griffiths & Seaton PLLC

(57) ABSTRACT

Some embodiments of the invention relate to a method of managing a distributed compression system comprised of a plurality of compression modules. According to some embodiments of the invention, a method of managing a distributed compression system comprised of a plurality of compression modules may include implementing a load balancing distribution scheme in respect of a plurality of currently active compression modules, providing a reference key for each of a plurality of data units which are intended for being compressed, the reference key of each data unit being based upon at least a portion of the content of the data unit, and applying the load balancing distribution scheme in respect the reference key of each of the plurality of data units so as to designate for each data unit a compression module from amongst the plurality of compression modules to which the data unit is to be assigned, thereby giving rise to a substantially balanced distribution of the data units across the plurality of currently active compression modules.

17 Claims, 3 Drawing Sheets

(56) References Cited

U.S. PATENT DOCUMENTS

2009/0006156 A1* 1/2009 Hunt et al. .................. 705/7
2010/0281056 A1* 11/2010 Nonaka et al. ................ 707/770
2012/0317411 A1* 12/2012 Sundarrajan et al. ......... 713/153

* cited by examiner

METHOD, AN APPARATUS AND A SYSTEM FOR MANAGING A DISTRIBUTED COMPRESSION SYSTEM

FIELD OF THE INVENTION

This invention relates to the management of distributed compression systems.

BACKGROUND OF THE INVENTION

Published US application No. 2005/0015566 to Zohar et al. discloses a method for data distribution, including distributing logical addresses among an initial set of devices so as to provide balanced access, and transferring the data to the devices in accordance with the logical addresses. If a device is added to the initial set, forming an extended set, the logical addresses are redistributed among the extended set so as to cause some logical addresses to be transferred from the devices in the initial set of devices. There is substantially no transfer of the logical addresses amongst the initial set. A similar solution is suggested in case of a device being removed from the initial set.

Published US application No. 2003/034905 to Anton et al. discloses that a distributed compression of a data file can comprise a master server module for breaking the data file into data blocks and for transmitting the data blocks to worker server modules. A first worker server module can compress a first data block using a first compression algorithm, resulting in a first compressed data block. A second worker server module can compress the second data block using a second compression algorithm, resulting in a second compressed data block. The first and second compression algorithms can comprise the same algorithm or different algorithms. An archive module can save the first and second compressed data blocks in an archive file for storage or for transmission over a communication network. The worker server modules also can compress the respective data blocks using multiple compression algorithms and can choose the highest compressed result.

SUMMARY OF THE INVENTION

There is a need to provide a method, an apparatus and a system for managing a distributed compression system or device which includes a plurality of compression modules or units so that the load is substantially evenly distributed across the plurality of compression modules. There is a further need for the management of the distributed compression system to be responsive to a modification in respect of the number of compression modules in the distributed compression system (for example, removal or addition of a compression module or unit) and/or to a modification in respect of the overall throughput of the system or in respect of the relative throughput of one or more compression modules in the distributed compression system.

Some embodiments of the invention relate to a method of managing a distributed compression system comprised of a plurality of compression modules. According to some embodiments of the invention, a method of managing a distributed compression system comprised of a plurality of compression modules may include implementing a load balancing distribution scheme in respect of a plurality of currently active compression modules, providing a reference key for each of a plurality of data units which are intended for being compressed, the reference key of each data unit being based upon at least a portion of the content of the data unit, and applying the load balancing distribution scheme in respect the reference key of each of the plurality of data units so as to designate for each data unit a compression module from amongst the plurality of compression modules to which the data unit is to be assigned, thereby giving rise to a substantially balanced distribution of the data units across the plurality of currently active compression modules.

According to further embodiments of the invention, the method of managing a distributed compression system may include detecting a change in the number of currently active compression modules, and updating the load balancing distribution scheme in accordance with an updated number of currently active compression modules. According to still further embodiments of the invention, detecting a change in the number of currently active compression modules may include one or more of the following: detecting a removal or a deactivation of a compression module from the currently active compression modules; detecting an addition or an activation of a further compression module to the currently active compression modules.

According to some embodiments of the invention, providing a reference key for each of a plurality of data units may include generating a reference key for each of the plurality of data units. Generating a reference key may include applying a hashing function to at least a portion of a content of each of the plurality of data units thereby giving rise to a plurality of corresponding reference keys. The reference key may be further associated with one or more of the following: a file type associated with the corresponding data unit; a file extension associated with the corresponding data unit; data in respect of a date of creation associated with the corresponding data unit; data in respect of a most recent update associated with the corresponding data unit; and data in respect of an identity of a host from that is associated with the corresponding data unit.

According to some embodiments of the invention, each of the plurality of compression modules may be adapted to implement one or more of the following compression software and compression algorithms to compress a data unit assigned thereto: WinZip, WinRAR, gzip, bzip, bzip2, 7-Zip, Lempel-Ziv, Lempel-Ziv-Welsh (LZ77), Burrows_Wheeler transform and move-to-front transform and Huffman coding.

Still further embodiments of the invention relate to a method of managing a distributed compression system comprised of a plurality of compression modules which includes implementing a load balancing distribution scheme in respect of a plurality of currently active compression modules, wherein at least two of the compression modules have different relative compression throughputs; providing a reference key for each of a plurality of data units which are intended for being compressed, the reference key of each data unit being based upon at least a portion of the content of the data unit; and applying the load balancing distribution scheme in respect a reference key of each of the plurality of data units so as to designate for each of the plurality of data units a compression module from amongst the plurality of compression modules to which the data unit is to be assigned, thereby giving rise to a relative distribution of the data units across the plurality of compression modules which substantially matches the relative compression throughputs of the compression modules in the distributed compression system.

According to some embodiments of the invention, the method of managing the distributed compression system may further include detecting a change in the relative throughput of one or more of the compression modules in the distributed compression system; and updating the relative distribution of data units across the plurality of compression modules in accordance with the updated relative compression throughputs of the compression modules in the distributed compression system.

Still further embodiments of the invention relate to a distributed compression system. According to some embodiments of the invention, the distributed compression system may include a plurality of compression modules, a management module, a plurality of interfaces and a switch. According to some embodiments of the invention, the management module may be adapted to implement a load balancing distribution scheme in respect of the plurality of currently active compression modules. The plurality of interfaces may be adapted to receive a plurality of data units that are intended for being compressed by the distributed compression system. Each of the plurality of interfaces may include a copy of a reference key generation module. Each copy of the reference key generation module may be adapted to generate a reference key for a data unit received by the corresponding interface based upon at least a portion of the content of the data unit. The switch may be adapted to apply the load balancing distribution scheme in respect of the reference key generated for each of the plurality of data units so as to designate for each data unit a compression module from amongst the plurality of compression modules to which the data unit is to be assigned, thereby giving rise to a substantially balanced distribution of the data units across the plurality of currently active compression modules.

According to some embodiments of the invention, the management module may be adapted to update the load balancing distribution scheme in response to a change in the number of active compression modules in the system.

According to further embodiments of the invention, each copy of the key generation module may be adapted to apply a hashing function to at least a portion of a content of each of the plurality of data units, thereby giving rise to a plurality of corresponding reference keys.

Yet further embodiments of the invention relate to a distributed compression system which includes a plurality of compression modules, a management module and a plurality of interfaces. According to some embodiments of the invention, the management module may be adapted to implement a load balancing distribution scheme in respect of a plurality of currently active compression modules. The plurality of interfaces may be adapted to receive a plurality of data units that are intended for being compressed by the distributed compression system. Each of the plurality of interfaces may include a copy of a reference key generation module. Each copy of the reference key generation modules may be adapted to generate a reference key for a data unit received by the interface based upon at least a portion of a content of the data unit. The plurality of interfaces may be adapted to apply the load balancing distribution scheme in respect of the reference key generated for each of a plurality of data units so as to designate for each of the plurality of data units a compression module from amongst the plurality of compression modules to which the data unit is to be assigned, thereby giving rise to a substantially balanced distribution of the data units across the plurality of currently active compression modules.

According to some embodiments of the invention, the system may further include a switch. The switch may be adapted to receive the plurality of data units from the plurality of interfaces, and to assign each of the plurality of data units to one of the plurality of currently active compression modules according to instructions received from one of the interfaces.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
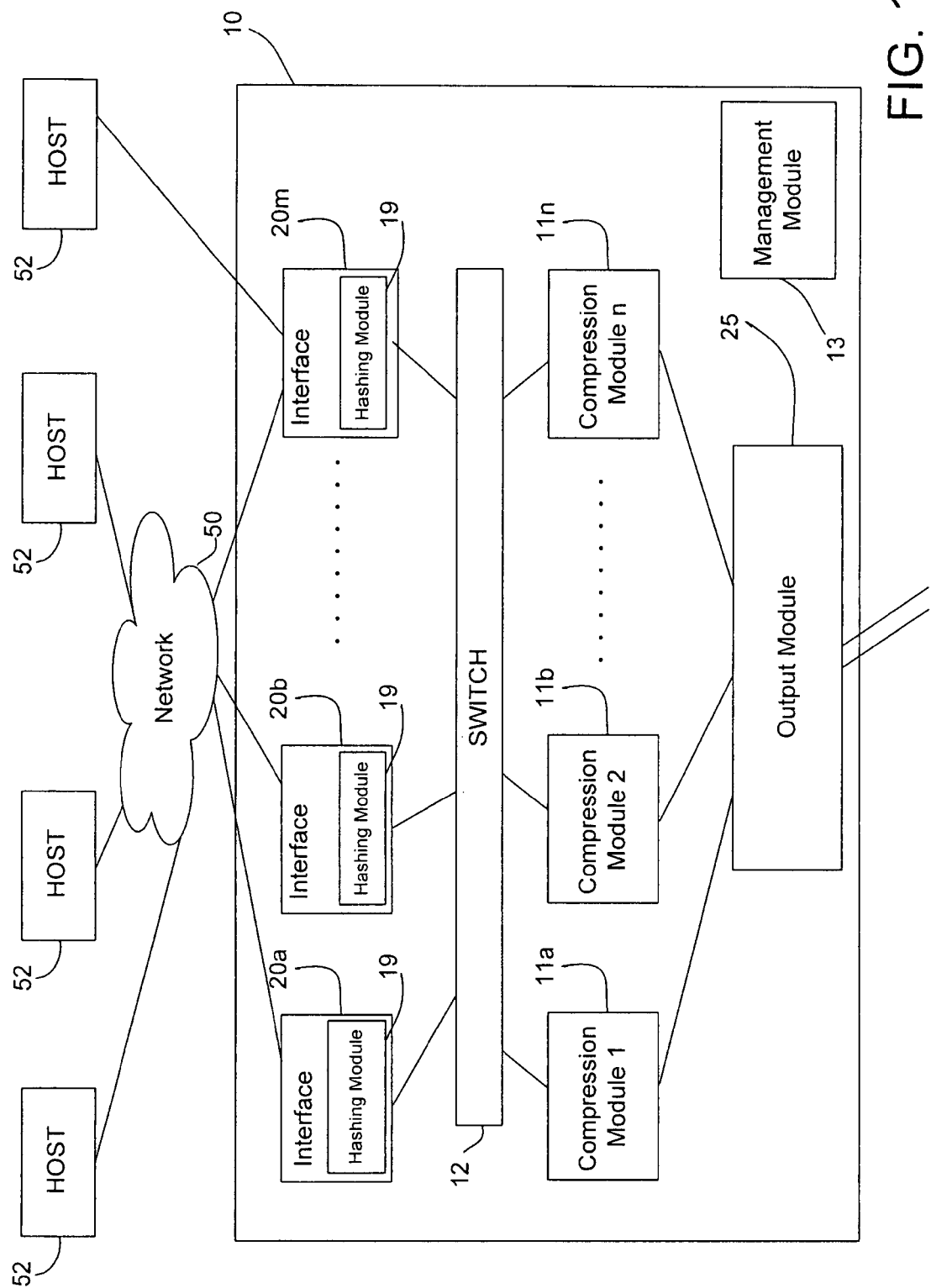
FIG. 1 is a block diagram illustration of a system including a device for managing a distributed compression of data, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "compressing", "distributing", "providing", "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It has been suggested to combine several distinct compression modules or units into one system which include said plurality of compression modules. Such a multi compression-units system may sometimes be referred to as "a distributed compression system" or as "a distributed compression device". The present invention relates to a method, an apparatus and a system for managing a distributed compression system or device. According to some embodiments of the invention, managing a distributed compression system including a plurality of compression modules may include distributing incoming data units that are received in the system for undergoing compression amongst the plurality of compression modules according to a load balancing distribution scheme that is intended to provide a substantially even distribution of data units across the plurality of compression modules. According to further embodiments of the invention, managing a distributed compression system may further include configuring the load balancing distribution scheme so that it is responsive to a modification in respect of the number of compression modules in the distributed compression system (for example, removal or addition of a compression unit). Further details in respect of some embodiments of the invention are provided below.

Reference is initially made to FIG. 1, which is a schematic block diagram illustration of one possible implementation of a system for managing a distributed compression system or device, according to some embodiments of the invention. In FIG. 1, and according to some embodiments of the invention, one or more host computers or computerized devices 52 may be operatively connected, either directly or through a network 50, to a distributed compression system 10. As mentioned above, the distributed compression system 10 may include a plurality of compression modules or units 11a, 11b . . . 11n (a general compression module in the array shall be referred to herein as—"CMi").

The distributed compression system 10 may further include a management module 13. The management module 13 may be adapted to manage the distributed compression system 10, including, but not necessarily limited to the management of a load balancing distribution scheme and the implementation thereof with respect to the plurality of compression modules 11. The management module 13 may be configured to manage the load balancing scheme and implement a load balancing distribution of data units across the plurality of compression modules in cooperation with one or more of the other components of the distributed compression system, such as the IFs and the switch for example. Further details in respect of the functional relation between the components of the distributed compression system 10 are provided below.

In general terms, the load balancing distribution scheme may be intended to enable a substantially even distribution of workload across the plurality of compression modules 11 in the distributed compression system 10. According to further embodiments of the invention, the load balancing distribution scheme implemented within the distributed compression system 10 may be responsive to the configuration of the distributed compression system, so that in response to the configuration of the distributed compression system 10 being modified, the load balancing distribution scheme may provide an update load balancing distribution taking into account the modification. Further details in respect of the load balancing distribution scheme and various aspects thereof shall be provided below.

Having described in general terms the load balancing distribution scheme, the description of the distributed compression system is now resumed. The distributed compression system 10 may also include or may be associated with one or more ports or interfaces (hereinafter—"IFs") 20a, 20b, . . . , 20m (a general IF in the array shall be referred to herein as—"IFk"). The host computers 52 may communicate with the distributed compression system 10 through the IFs 20. Data units from the hosts 52 may be transmitted to any one of the IFs 20, according to considerations or rules implemented by the network 50, or in accordance with an explicit request from the hosts 52 themselves.

The distributed compression system may further include a switch 12. The IFs 20 may be configured to communicate with each of the plurality of compression modules 1 in through the switch 12. Further details in respect of the functionality of the IFs 20 and the switch 12 in accordance with some embodiments of the invention are provided below.

As mentioned above, the distributed compression system 10 may include a plurality of compression modules 1. Each compression module CMi in the system may be configured to receive a data unit that is intended for being compressed, process the data unit and generate a corresponding compressed version of the received data unit. Various data compression algorithms, techniques and software are well known and may be utilized as part of some embodiments of the invention. Some examples of compression algorithms and details in respect of some compression software which are sold on the market or which are otherwise available to the public are provided below.

Figure 2:
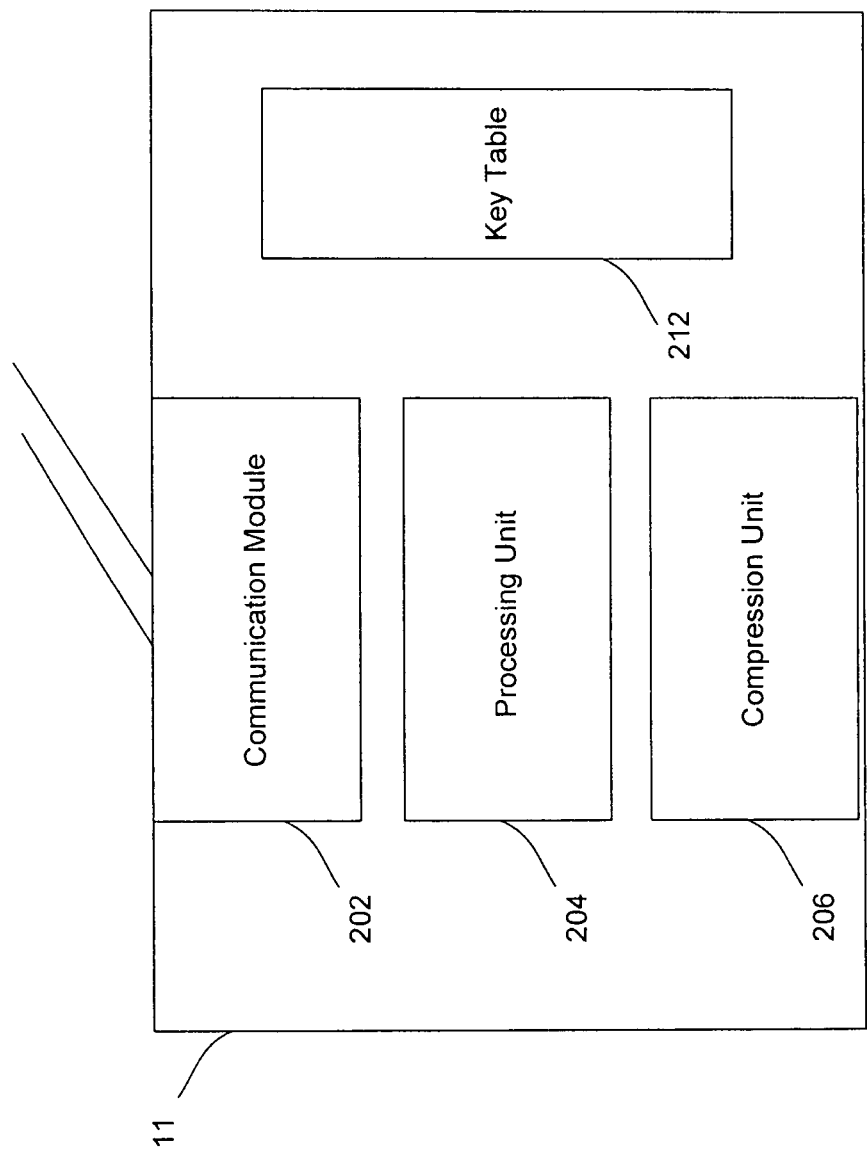
FIG. 2 is a flowchart illustration of illustration of a system including a device for managing a distributed compression of data, according to some embodiments of the invention.

Reference is now additionally made to FIG. 2, which is a block diagram illustration of one example of a compression module which may be implemented as part of a distributed compression system. According to some embodiments of the invention, each compression module CMi may include a communication module 202, a processing unit 204 and a compression unit 206. The communication module 202 may enable communication between the compression module 11 and each of the other components of the distributed compression system 10. The processing unit 204 may be adapted to provide processing services to one or more components of the compression module 11 and may be adapted to manage the operation thereof. The compression unit 206 may be adapted to compress or decompress data received at the compression module 11. The compression unit 206 may be implemented using any necessary software and/or hardware components, and may be adapted to compress/decompress data independently or in cooperation with the processing unit 204.

Each of the plurality of compression modules 11 in the distributed compression system 10 may be connected, either directly or through an appropriate switch, to one or more output modules 25. According to some embodiments of the invention, an output module 25 may be configured to allow compressed data from the compression system to reach or to be directed towards any further processing or storage system(s) or device(s) (not shown) to which the system 10 may be connected.

According to some embodiments of the invention, the distributed compression system 10 may be configured to intercept or otherwise receive data units from the hosts 52, to compress the data units received from the hosts 52, and to further communicate the compressed data to a processing or storage system, for example, to a processing or storage system which has been the original intended destination of the data unit. According to embodiments of the invention, a data unit received at the distributed compression system may or may not specify the distributed compression module as an intermediary address through which the data unit needs to pass en route to an ultimate destination. According to still further embodiments of the invention, a data unit that is received at the compression module 10 may be intended specifically and exclusively for the compression system, and the compression system may or may not forward the compressed data to a processing or storage system included as part of the compression system or associated therewith. For illustration purposes, as part of the description of the non-limiting embodiments of the invention provided herein, the original intended destination of a data unit received at the distributed compression module is a storage system, and the storage system is the (actual) destination of the data after being compressed at the distributed compression system 10.

It would be appreciated that the implementation of the distributed compression system illustration by FIG. 1 and discussed herein is one, non-limiting example of a possible implementation of a distributed compression system according to some embodiments of the invention, and that further embodiments of the invention may not be bound by this particular configuration.

Having described the main components of the distributed compression system 10 and the related systems/devices and the basic inter-functionality of the various systems/devices, there is now provided a detailed description of the operation of the distributed compression system and the management thereof. The description provided below with respect to the operation of the distributed compression system and with respect to the management thereof illustrates some embodiments of the invention. Additional reference is now made to FIG. 3, which is a flowchart illustration of a method of managing a distributed compression system or device, according to some embodiments of the invention.

According to some embodiments of the invention, initially a data unit DU communicated by a host 52 to the distributed compression system may be received at one of the IFs 20 (block 310). According to some embodiments of the invention, each IF (IFk) 20 in the distributed compression system 10 may be configured to provide a reference key KDU for each data unit DU received at the IF (block 320). According to some embodiments of the invention, each IF (IFk) 20 in the distributed compression system 10 may be configured to calculate a hashing key for each data unit DU receive at the IF. It would be appreciated that the use of a hashing function to calculate a reference key KDU for each data unit DU received at any one of the interfaces 20 of the distributed compression system 10 constitutes one example of a technique which may be used to provide a reference key for each of a plurality of data units that are intended for being compressed by the distributed compression system 10 according to some embodiments of the invention. For convenience, in the following description of some embodiments of the invention, reference shall be made to a hashing key as an example of a reference key.

There are various known algorithms and functions which may be used for calculating the hashing key KDU. According to some embodiments of the invention, a hashing key KDU may be calculated for each data unit DU that is intended for being compressed based upon at least a portion of the content of the data unit. For example, a hashing function may be applied to the content of each data unit, and the value returned by the hashing function may be used as the hashing key for that data unit.

It would be appreciated that the hashing function may be applied in respect of various additional components or attributes of a data unit. For example, the hashing function may be applied to one or more of the following: a file type associated with the data unit; a file extension associated with the data unit; data in respect of a date of creation associated with the data unit; data in respect of a most recent update associated with the data unit; data in respect of an identity of a host that is associated with the data unit. It would also be appreciated that some or all of the components of a data unit mentioned above may be incorporated within a metadata portion of a data unit or may otherwise be included within or associated with a data unit.

According to some embodiments of the invention, each IF 20m in the system 10 may include a copy of a reference key generation module. Each copy of the reference key generation module may be functionally identical to each of the other copies. Thus, all other things being equal, any particular data unit DU would always be assigned the same reference key KDU no matter which IF receives the data unit DU.

By was of example, in FIG. 1, and according to further embodiments of the invention, each IF 20m in the system 10 may include a copy of a hashing module 19. As part of the present invention, a common hash algorithm, function and/or table may be implemented by each IF 20m (or by each copy of the hashing module 19). Thus, all other things being equal, any particular data unit DU would always be assigned the same hashing key KDU no matter which IF receives the data unit DU. It would be appreciated that by including functionally identical copies of a hashing module 19 (as an example of a reference key generation module) within each IFk as suggested in accordance with some embodiments of the invention, it is possible to avoid having to utilize a central unit to manage the hashing and the generation of the hashing keys for the data units, so long as the overall configurations of the system and the load balancing distribution scheme remain unchanged. The load balancing distribution scheme and the management of the load balancing distribution scheme shall be discussed in greater detail below. Thus, in addition to providing distributed compression, a distributed compression system according to some embodiments of the invention may also provide for distributed interfacing and distributed hashing, further increasing the flexibility, scalability and other desired operational characteristics of the system.

Figure 3:
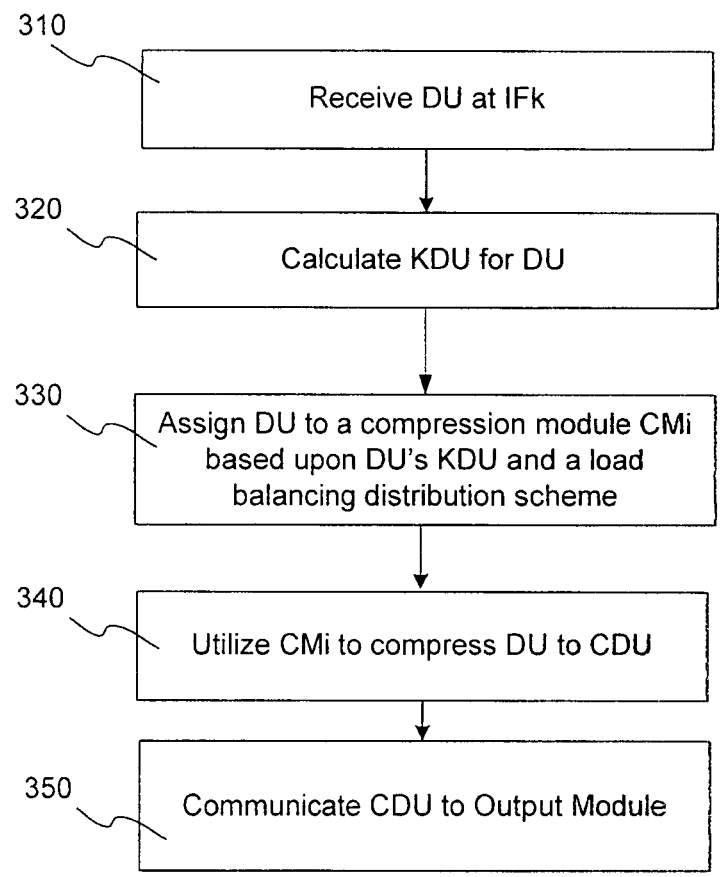
FIG. 3 is flowchart illustration of a method of managing a distributed compression system including a plurality of compression modules, according to some embodiments of the invention.

Returning now to the description of FIG. 3, once a hashing key KDU is calculated for a data unit DU, the DU may be assigned to a compression module based upon its hashing key KDU and a load balancing distribution scheme (block 330). According to some embodiments of the invention, each IF 20k in the system 10 may include a copy of a current load balancing distribution scheme. In order to determine to which of the compression modules a data unit DU is to be assigned, the IF which is handling the assignment of the DU may consult its copy of the load balancing distribution scheme. Given a certain hashing key KDU, the load balancing distribution scheme may be used to designate one of the compression modules CMi 11 that is to be assigned for receiving the data unit DU and compressing it. It would be appreciated that according to further embodiments of the invention, the process of designating a compression module for each of a plurality of data units that are intended for being compressed may be carried out by other components of the distributed compression system 10. For example, the switch 12 may be responsible for applying the load balancing distribution scheme in respect of the reference key KDU generated for each of a plurality of data units so as to designate for each data unit DU a compression module CMi from amongst the plurality of compression modules to which the data unit DU is to be assigned.

According to some embodiments of the invention, the load balancing distribution scheme may be generated and updated from time to time by the management module 13, for example, and transmitted to each of the IFs 20 whenever necessary. According to some embodiments of the invention, based upon the load balancing distribution scheme a load balancing distribution table or other data structure may be calculated in advance so that the association between each active compression module CMi and each possible hashing key KDU or each group of hashing keys may be established in advance. In accordance with another example, a mapping is created associating in advance groups of hashing keys and specific compression modules. Alternatively, according to further embodiments of the invention, a load balancing distribution is applied on-the-fly in respect of each hashing key generated for a data unit, and the association between one of the active compression modules CMi and an incoming data unit may be established shortly after the data unit is received at the distributed compression system 10. According to still further embodiments of the invention, in both cases, a central or distributed management module 13 may be used to generate, implement and manage the framework of the load balancing distribution scheme, as will be described in greater detail below. Further details in respect of the generation of the load balancing distribution scheme and the updating of the load balancing distribution scheme shall be provided below.

After a compression module CMi has been designated for the data unit, the data unit may be input to the designated compression module CMi. Upon receipt of the data unit DU, the compression module CMi may be utilized to compress DU (block 340) to provide a corresponding compressed data unit CDU. A compression module CMi may include a compressed data unit table (not shown). The compressed data unit table may be used to store data in respect of each data unit DU processed by the compression module CMi. For example, each record within the table may include a reference number identifying the data unit DU, the data unit's hashing key KDU, and the data unit's corresponding compressed data unit (the compressed counterpart of the data unit).

According to some embodiments of the invention, each compression module CMi in the distributed compression system 10 may be adapted to utilize any known or yet to be devised in the future compression algorithm, compression software, compression method, compression process and/or compression technique, and any combination thereof. For example, according to embodiments of the invention, a compression module 11 may utilize one or more of the following compression proprietary and non-proprietary programs: WinZip® (by WinZip Computing Mansfield, Conn.) WinRAR® (by win.rar GmbH Bremen Germany) gzip (an open source program), bzip and bzip2 (both are open source programs) and 7-Zip (an open source program). Further by way of example, a compression module 11 may utilize one or more of the following well-known compression algorithms: Lempel-Ziv, Lempel-Ziv-Welsh (LZ77), Burrows_Wheeler transform, move-to-front transform and Huffman coding. It would be appreciated that more than one compression module in the distributed compression system may be configured to utilize a certain compression algorithm, compression software, compression method, compression process and/or compression technique.

After being compressed, the compressed data CDU corresponding to the data unit DU received at the distributed compression system 10 may be delivered to the output module 25 (block 350). The output module 25 may transmit the compressed data CDU out of the system 10. As mentioned above, according to some embodiments of the invention, in the distributed compression system 10 a common output module may service each of the plurality of compression modules. However, according to further embodiments of the invention, an array including a plurality of output modules may be provided as part of the distributed compression system 10, and each of the plurality of output modules may be operatively associated with one specific compression module or with a group of compression modules. According to a further embodiment of the invention, the array of compression modules may be connected to the plurality of compression modules through a switch and the compressed data may be distributed amongst the plurality of output modules by a switch. According to still further embodiments of the invention, one or more of the plurality of compression modules CMi 11 may include or may be directly connected to a storage or to a processing system or device, and an output module may not be required to service that compression module CMi 11.

There is now provided a more detailed description in respect of a load balancing distribution scheme which may be created and implemented within the distributed compression system, according to some embodiments of the invention. As mentioned above, the load balancing distribution scheme may be intended to enable a substantially even distribution of workload across the plurality of compression modules 11 in the distributed compression system 10. One example of a load balancing distribution scheme includes the use of a modulo function, wherein the modulus is the current number of active compression modules 11 in the system 10.

For example, if there are currently 6 (six) active compression modules within a distributed compression system, and assuming that a load balancing distribution scheme that is based on a modulo function is implemented within the distributed compression system, the management module 13 may inform each of the IFs in the system with that there are currently 6 active compression modules in the system. Based on the information received from the management module 13, each of the IFs may assign incoming data units to the 6 compression modules according to a modulo 6 distribution scheme. That is, each IF in receipt of a data unit DU may calculate a hash key KDU for the data unit and further calculate the value KDU(mod 6). Based on the result of the modulo function, it may be established which one of the compression modules in the system should be assigned with the incoming DU.

For example, according to one embodiment of the invention, the management module 13 may assign to each of the currently active compression modules 11 a unique integral identity. For example, referring to FIG. 1, the management module 13 may assign a unique number between 0 and (n−1) (a total of n integers) to each of the currently active compression modules 11a, 11b, . . . , 11n (a total of n units). The management module 13 may provide the information in respect of each compression module's unique integral identity to a switch. As mentioned above, the switch may be adapted to receive incoming data units from the IFs and direct each data unit to one of the plurality of compression modules. Thus, according to some embodiments of the invention, each IF may be configured to include or associate each data unit it sends to the switch with the result of a modulo function calculated in connection with the data unit and as part of the implementation of the load balancing distribution scheme, and the switch may direct the data unit to the compression module whose unique integral identity matches the number provided by the IF.

It would be appreciated that a load balancing distribution scheme that is based on a modulo function is one example of a possible load balancing distribution scheme which may be implemented within the distributed compression system. Moreover, further examples of load balancing distribution schemes which may also be used to substantially evenly distribute the workload across a plurality of compression modules within a distributed compression system are described in detail in US Published Patent Application No. 2005/0015566, filed Jul. 15, 2003, and which is commonly assigned to the assignee of the present patent application. US Published Patent Application No. 2005/0015566 has been incorporated by reference in its entirety into the present patent application.

Still further, according to some embodiments of the invention, a load balancing distribution scheme may be provided which uses a random function (or a substantially random function) to randomly designate one of a plurality of currently active compression modules to each of a plurality of data units. The load balancing distribution scheme may, for example, include applying a random function to the hashing key generated for a data unit, and based on the value returned by the random function, designating one of the compression modules CMi.

For example, each of the plurality of compression modules 11 may be assigned with a unique integral identity. Further by way of example, referring to FIG. 1, the management module 13 may assign a unique number between 0 and (n−1) (a total of n integers) to each of the compression modules 11*a*, 11*b*, ..., 11*n* (a total of n units) which are currently active in the compression system 10. When a data unit is received at the distributed compression system 10, the interface IFk at which the data unit is received may generate a hashing key for the data unit and then apply the load balancing distribution scheme including the random function in respect of the hashing key. The random function may be configured to return an integer which corresponds to one of the currently active compression modules (for example one of the integral identities), and the integer may be used to designate the compression module to which the data unit is to be assigned.

It would be appreciated that, according to some embodiments of the invention, the management module 13 may be configured to select which load balancing distribution scheme is to be implemented within the distributed compression system at any given time. Furthermore, the management module 13 may be adapted to program the interface module in accordance with various load balancing distribution schemes and in accordance with various parameters of a load balancing distribution scheme, from time to time.

According to further embodiments of the invention, the load balancing distribution scheme implemented within the distributed compression system 10 may be configured so that it is responsive to the configuration of the distributed compression system. Accordingly, the load balancing distribution scheme may be configured so that in response to a modification in respect of the configuration of the distributed compression system 10, an updated implementation of the load balancing distribution is provided, the updated implementation taking into account the modification. For example, according to some embodiments of the invention, the management module 13 may monitor the array of compression modules 11 and whenever an additional compression module (one or more) is added to the array (or an existing non-active compression module is activated) and/or whenever a compression module is removed from the array (or becomes inactive), the management module 13 may be adapted to update the implementation of the load balancing distribution scheme. The management module 13 may be adapted to update the implementation of the load balancing distribution scheme, so that the change is taken into account and the substantially even distribution of workload is maintained across the extended or depleted array of compression modules.

For example, referring back to the example of the load balancing distribution scheme implemented within a distributed compression system which includes 6 (six) active compression modules. Assuming that an additional compression module is added to the distributed compression system, the management module 13 may detect the addition of the additional compression module to the system. Upon detecting the addition of the compression module, the management module may be configured to update each of the IFs within the distributed compression system that there are now 7 active compression modules in the system. Based on the information received from the management module 13, each of the IFs may assign incoming data units to the 7 compression modules according to a modulo 7 distribution scheme. That is, each IF in receipt of a data unit DU may calculate a hash key KDU for the data unit and further calculate the value KDU(mod 7). Based on the result of the modulo function, it may be established which one of the compression modules in the system should be assigned with the incoming DU.

In addition, the management module 13 may assign to the newly added compression module a unique integral identity, so that each of the currently active compression modules 11 has a unique integral identity. The management module 13 may provide the updated information in respect of each compression module's unique integral identity to the switch, and the switch may direct each data unit received from the IFs to the compression module whose unique integral identity matches the number provided by the IF (which may be, for example the result of the application of the modulo function on the hashing key calculated for the data unit).

In the description of the embodiments of the invention hereinbelow, the distributed compression system is assumed to include a plurality of compression modules having substantially equal or identical characteristics, including but not limited to equal compression rates or throughput. It should however be appreciated that some embodiments of the invention are not limited in this respect and that further embodiments of the invention may not be bound to providing substantially even distribution of data unit across a plurality of compression modules having different compression and operational characteristics. For example, according to some embodiments of the invention, in accordance with one implementation of a load balancing distribution scheme the relative amount of data units that is to be assigned to each compression module may correspond to the relative throughput of the compression module. Those skilled in the art should be able to adapt the teachings provided herein when different compression modules in the system have different compression throughput (or other different characteristics), in which case the ratios of the throughputs may typically be used to determine the distribution of incoming data units across the plurality of compression modules.

In the description of some embodiments of the invention provided above reference has been made to a distributed compression system and to a method of managing a distributed compression system. However, further embodiments of the invention relate to a distributed decompression system and the management thereof. Those with ordinary skill in the art will appreciate how the embodiments of the invention described above may be modified to become compatible with a distributed decompression system and the management thereof.

It would be appreciated, that the above described configuration is merely an example of a configuration which may benefit from the introduction of a distributed compression device which includes the load balancing distribution capabilities according to some embodiments of the invention.

Furthermore, the distributed compression device according to some embodiments of the invention may be implemented in conjunction with any other source of data and/or with any other recipient (or intended recipient of data). The source of the data received by the distributed compression device may be any suitable unit, device, or system that is capable of providing data, and similarly, the destination of the data may be any suitable unit, device or system where data may be stored process and/or serviced. It would also be appreciated that data compression device according to some embodiments of the invention provides several benefits under certain circumstances, including but not limited to, reduced storage requirements and reduced bandwidth requirements.

It will also be understood that, as mentioned above, the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. A method of managing a distributed compression system comprising a plurality of compression modules, the method comprising:
    selecting, via a processor, a load balancing distribution scheme at a first time for a plurality of currently active compression modules, wherein the load balancing distribution scheme is based on a modulo distribution function;
    assigning a reference key to each of the plurality of data units, wherein the reference key of each data unit is based upon at least a portion of the content of the data unit;
    utilizing the modulo distribution function to apply, via the processor, the load balancing distribution scheme with respect to the reference key of each of the plurality of data units to designate a respective compression module for each data unit from amongst the plurality of currently active compression modules to which the data unit is to be assigned, thereby giving rise to a balanced distribution of the plurality of data units across the plurality of currently active compression modules;
    compressing, via the load balanced plurality of currently active compression modules, the plurality of data units;
    transmitting, via a single output module, the plurality compressed data units to a storage system; and
    selecting, via the processor, a different load balancing distribution scheme at a second time for the plurality of currently active compression modules,
        wherein each currently active compression module is configured for applying a same compression technique on a plurality of data units scheduled for compression at each of the first time and the second time.

2. The method according to claim 1, further comprising:
    detecting a change in the number of currently active compression modules; and
    updating the load balancing distribution scheme in accordance with an updated number of currently active compression modules.

3. The method according to claim 2, wherein said detecting comprises one or more of the following:
    detecting a removal or a deactivation of a compression module from the currently active compression modules; and
    detecting an addition or an activation of a further compression module to the currently active compression modules.

4. The method according to claim 1, wherein said providing a reference key for each of a plurality of data units, further comprises generating a reference key for each of the plurality of data units.

5. The method according to claim 4, wherein said generating further comprises applying a hashing function to at least a portion of the content of each of the plurality of data units thereby giving rise to a plurality of corresponding reference keys.

6. The method according to claim 1, wherein the reference key is further associated with one or more of the following:
    a file type associated with the corresponding data unit;
    a file extension associated with the corresponding data unit;
    data in respect of a date of creation associated with the corresponding data unit;
    data in respect of a most recent update associated with the corresponding data unit; and
    data in respect of an identity of a host that is associated with the corresponding data unit.

7. The method according to claim 1, wherein each of the plurality of compression modules is adapted to implement one or more of the following compression software and compression algorithms to compress a data unit assigned thereto: WinZip, WinRAR, gzip, bzip, bzip2, 7-Zip, Lempel-Ziv, Lempel-Ziv-Welsh (LZ77), Burrows Wheeler transform and move-to-front transform and Huffman coding.

8. A method of managing a distributed compression system comprising a plurality of compression modules, the method comprising:
    selecting, via a processor, a load balancing distribution scheme at a first time for a plurality of currently active compression modules, wherein at least two of the compression modules have different relative compression throughputs, the load balancing distribution scheme based on a modulo distribution function;
    assigning a reference key to each of a plurality of data units that are scheduled for compression, the reference key of each data unit being based upon at least a portion of the content of the data unit;
    utilizing the modulo distribution function to apply, via the processor, the load balancing distribution scheme with respect to a reference key of each of the plurality of data units to designate for each of the plurality of data units a respective compression module from amongst the plurality of currently active compression modules to which the data unit is to be assigned, thereby giving rise to a relative distribution of the data units across the plurality of compression modules which matches the relative compression throughputs of the compression modules in the distributed compression system;
    compressing, via the load balanced plurality of currently active compression modules, the plurality of data units;
    transmitting, via a single output module, the plurality compressed data units to a storage system; and
    selecting, via the processor, a different load balancing distribution scheme at a second time for the plurality of currently active compression modules, wherein each currently active compression module is configured for applying a same compression technique on a plurality of data units scheduled for compression at each of the first time and the second time.

9. The method according to claim 8, further comprising:
detecting a change in the relative throughput of one or more of compression modules in the distributed compression system; and
updating the relative distribution of data units across the plurality of compression modules in accordance with the updated relative compression throughputs of the compression modules in the distributed compression system.

10. The method according to claim 8, wherein said providing further comprises applying a hashing function to at least a portion of the content of each of the plurality of data units thereby giving rise to a plurality of corresponding reference keys.

11. A distributed compression system, the system comprising:
a plurality of currently active compression modules configured for applying a same compression technique on a plurality of data units scheduled for compression;
a processor comprising a management module coupled to the plurality of currently active compression modules, the management module configured for:
selecting a load balancing distribution scheme at a first time for the plurality of currently active compression modules, the load balancing distribution scheme based on a modulo distribution function, and
selecting a different load balancing distribution scheme at a second time for the plurality of currently active compression modules,
wherein each currently active compression module is configured for applying a same compression technique on a plurality of data units scheduled for compression at each of the first time and the second time;
a plurality of interfaces, the plurality of interfaces configured for receiving the plurality of data units for compressing by the distributed compression system, wherein each of said plurality of interfaces includes a copy of a reference key generation module, wherein each copy of said reference key generation modules is configured for generating a reference key for a data unit received by the interface based upon at least with a portion of the content of the data unit;
a switch coupled to the plurality of currently active compression module and to the plurality of interfaces, the switch configured for utilizing the modulo distribution function to apply the load balancing distribution scheme with respect to the reference key generated for each of the plurality of data to designate for each data unit a respective compression module from amongst the plurality of currently active compression modules to which each data unit is to be assigned, thereby giving rise to a substantially balanced distribution of the data units across the plurality of currently active compression modules; and
a single output module coupled to the plurality of active compression modules and configured for transmitting the plurality of data units subsequent to compression to a storage system.

12. The distributed compression system according to claim 11, wherein said management module is adapted to update the load balancing distribution scheme in response to a change in the number of active compression modules in the system.

13. The distributed compression system according to claim 11, wherein each of said plurality of interfaces is adapted to apply a hashing function to at least a portion of the content of each of the plurality of data units, thereby giving rise to a plurality of corresponding reference keys.

14. A distributed compression system, the system comprising:
a plurality of currently active compression modules configured for applying a same compression technique on a plurality of data units scheduled for compression;
a processor comprising a management module coupled to the plurality of currently active compression modules, the management module configured for:
selecting a load balancing distribution scheme at a first time for a plurality of currently active compression modules, the load balancing distribution scheme based on a modulo distribution function, and
selecting a different load balancing distribution scheme at a second time for the plurality of currently active compression modules,
wherein each currently active compression module is configured for applying a same compression technique on a plurality of data units scheduled for compression at each of the first time and the second time;
a plurality of interfaces, the plurality of interfaces configured for receiving the plurality of data units for compressing by the distributed compression system, wherein each of said plurality of interfaces includes a copy of a reference key generation module, wherein each copy of said reference key generation modules is configured for generating a reference key for a data unit received by the interface based upon at least with a portion of the content of the data unit, the plurality of interfaces further configured for utilizing the modulo distribution function to apply the load balancing distribution scheme with respect to the reference key generated for each of a plurality of data units to designate for each of the plurality of data units a respective compression module from amongst the plurality of currently active compression modules to which the data unit is to be assigned, thereby giving rise to a balanced distribution of the data units across the plurality of currently active compression modules; and
a single output module coupled to the plurality of active compression modules and configured for transmitting the plurality of data units subsequent to compression to a storage system.

15. The system according to claim 14, further comprising a switch, the switch being adapted to receive the plurality of data units from said plurality of interfaces, and to assign each of said plurality of data units to one of the plurality of currently active compression modules according to instructions received from one of the interfaces.

16. A non-transitory computer program product comprising a computer useable medium having computer readable program code embodied therein of managing a distributed compression system comprised of a plurality of compression modules, the computer program product comprising:
computer readable program code for selecting a load balancing distribution scheme at a first time for a plurality of currently active compression modules, the load balancing distribution scheme based on a modulo distribution function and each currently active compression module is configured for applying a same compression technique on a plurality of data units scheduled for compression;

computer readable program code for assigning a reference key to each of the plurality of data units, wherein the reference key of each data unit is based upon at least a portion of the content of the data unit;

computer readable program code for utilizing the modulo distribution function to apply the load balancing distribution scheme with respect to the reference key of each of the plurality of data units to designate for each data unit a respective compression module from amongst the plurality of currently active compression modules to which the data unit is to be assigned, thereby giving rise to a balanced distribution of the plurality of data units across the plurality of currently active compression modules;

computer readable program code for compressing, via the load balanced plurality of currently active compression modules, the plurality of data units;

computer readable program code for transmitting, via a single output module, the plurality compressed data units to a storage system; and computer readable program code for selecting a different load balancing distribution scheme at a second time for the plurality of currently active compression modules, wherein each currently active compression module is configured for applying a same compression technique on a plurality of data units scheduled for compression at each of the first time and the second time.

17. A non-transitory computer program product comprising a computer useable medium having computer readable program code embodied therein of managing a distributed compression system comprised of a plurality of compression modules, the computer program product comprising:

computer readable program code for selecting a load balancing distribution scheme at a first time for a plurality of currently active compression modules, wherein at least two of the compression modules have different relative compression throughputs, the load balancing distribution scheme based on a modulo distribution function;

computer readable program code for providing a reference key for each of a plurality of data units which are intended for being compressed, the reference key of each data unit being based upon at least a portion of the content of the data unit;

computer readable program code for utilizing the modulo distribution function to apply the load balancing distribution scheme with respect to a reference key of each of the plurality of data units to designate for each of the plurality of data units a respective compression module from amongst the plurality of compression modules to which the data unit is to be assigned, thereby giving rise to a relative distribution of the data units across the plurality of currently active compression modules which matches the relative compression throughputs of the compression modules in the distributed compression system;

computer readable program code for compressing, via the load balanced plurality of currently active compression modules, the plurality of data units;

computer readable program code for transmitting, via a single output module, the plurality compressed data units to a storage system; and computer readable program code for selecting a different load balancing distribution scheme at a second time for the plurality of currently active compression modules, wherein each currently active compression module is configured for applying a same compression technique on a plurality of data units scheduled for compression at each of the first time and the second time.

* * * * *